United States Patent [19]
Retzloff et al.

[11] Patent Number: 5,146,949
[45] Date of Patent: Sep. 15, 1992

[54] CHECK VALVE WITH SPRING LOADED CLAPPER ASSEMBLY

[75] Inventors: James G. Retzloff, Lansing; Perin E. Truax, Caledonia, both of Mich.

[73] Assignee: The Viking Corporation, Hastings, Mich.

[21] Appl. No.: 653,883

[22] Filed: Jan. 4, 1991

[51] Int. Cl.⁵ ............................................. F16K 15/03
[52] U.S. Cl. ..................................... 137/527; 251/337
[58] Field of Search ................. 137/527, 527.2, 527.4, 137/527.6; 251/298, 303, 337

[56] References Cited

U.S. PATENT DOCUMENTS

| | | | |
|---|---|---|---|
| 354,279 | 12/1886 | Weimer | 137/527 |
| 602,437 | 4/1898 | Ellithorpe | 137/527 X |
| 945,151 | 1/1910 | Blauvelt | 137/527.4 X |
| 1,587,206 | 6/1926 | Williams | 137/527.8 X |
| 2,037,023 | 4/1936 | Holby | 137/527.8 X |
| 2,285,756 | 6/1942 | Schweighart | 137/527.6 |
| 2,342,485 | 2/1944 | Percifield, Jr. | 137/527 X |
| 2,748,788 | 6/1956 | Duckstein | 137/527 X |
| 2,827,921 | 3/1958 | Sherman et al. | 137/527 |
| 2,852,036 | 9/1958 | Riza | 137/527 X |
| 2,927,182 | 3/1960 | Barkan et al. | 137/527 X |
| 3,173,439 | 3/1965 | Griswold et al. | 137/527.4 X |
| 3,283,772 | 11/1966 | Ensign | 137/527.4 X |
| 3,482,603 | 12/1969 | Outcalt | 137/527 X |
| 3,789,874 | 2/1974 | Hills | 137/527 |
| 3,817,278 | 6/1974 | Elliott | 137/527 |
| 4,019,532 | 4/1977 | Schittek | 137/527 |
| 4,188,973 | 2/1980 | Weise et al. | 137/527.4 X |
| 4,457,333 | 7/1984 | Sharp | 137/527 X |
| 4,595,032 | 7/1986 | Banks | 137/527 |
| 4,989,635 | 2/1991 | Dunmire | 137/527 |

Primary Examiner—John Rivell
Attorney, Agent, or Firm—Price, Heneveld, Cooper, DeWitt & Litton

[57] ABSTRACT

A check valve assembly adapted for use in a fire protection system includes a housing defining an inlet, an outlet, a seat and a chamber. A clapper or valve element is mounted within the chamber for movement towards and away from the seat. A parallelogram linkage supports the clapper. A pair of draw bars extend diagonally between opposed links. Each draw bar defines a stop. A coil spring encircles the draw bars and engages the stops. Expansion of the coil spring forces the draw bars apart and resiliently biases the clapper or valve element against the valve seat.

24 Claims, 1 Drawing Sheet

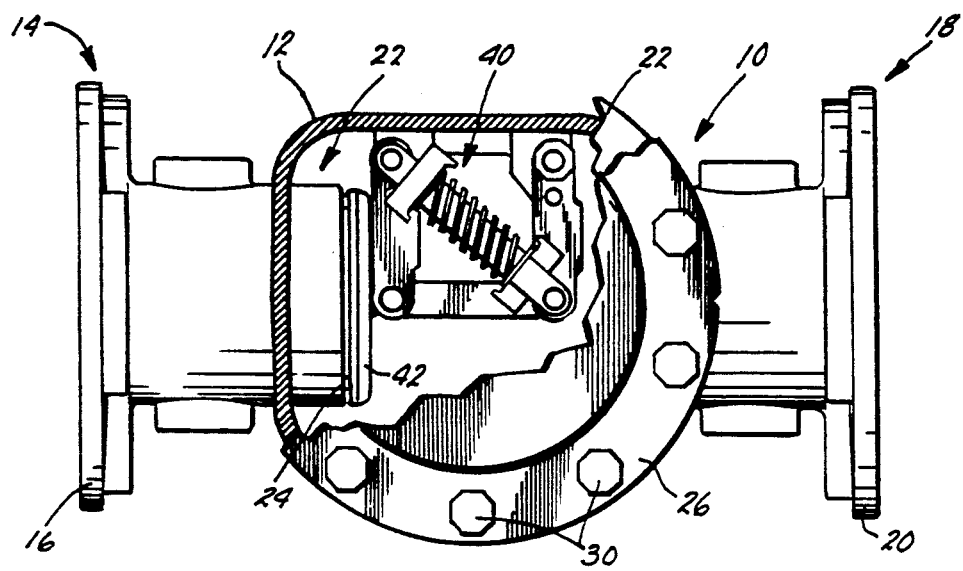
Fig. 1.
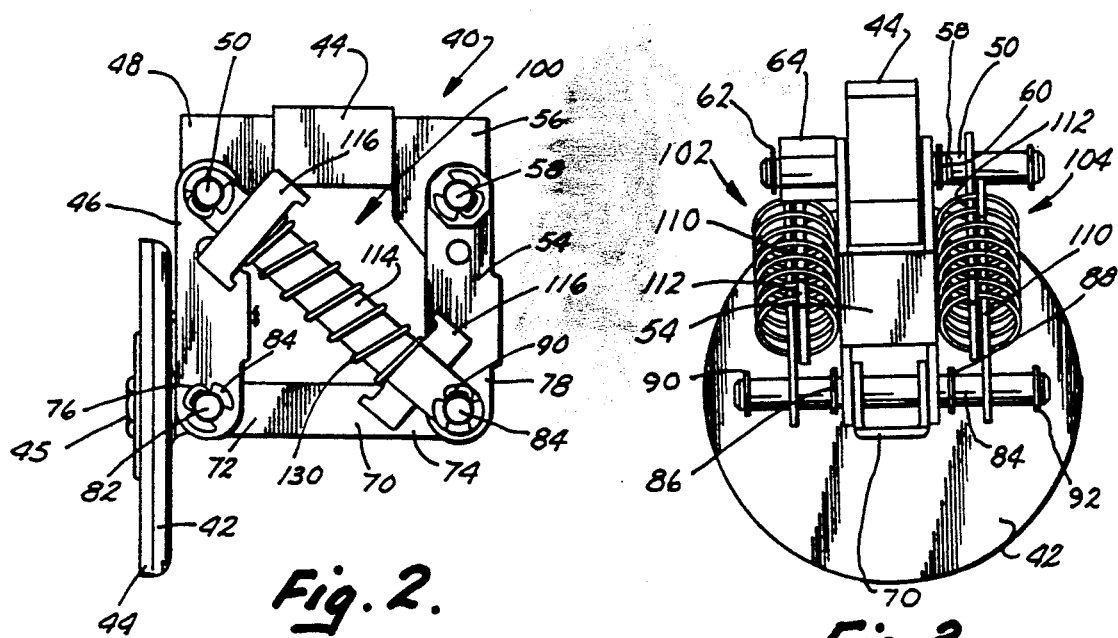
Fig. 2.
Fig. 3.

CHECK VALVE WITH SPRING LOADED CLAPPER ASSEMBLY

BACKGROUND OF THE INVENTION

The present invention relates to check valves and, more particularly, to detector check valves for use in fire protection systems.

A typical fire protection system includes a riser or supply pipe connected to a water main. Branches are connected to the riser and extend throughout the building to the areas to be protected. Drop pipes are secured to the branches. Each drop pipe supports an automatic sprinkler head. Each head may include a body defining a nozzle, a deflector, a cap or plug within the nozzle and a thermal trigger. When a predetermined temperature is reached indicating a fire condition, the trigger releases the cap permitting water or other fire suppression fluid to flow from the nozzle to the area of the fire.

Such systems may include a detector check valve in the supply piping to the riser. Generally, the check valve, which permits flow in one direction only, includes a clapper or valve element which is held against a valve seat so that a predetermined pressure differential across the valve is necessary to permit flow through the valve. The valve differential permits the installation of a by-pass water meter which is used by water authorities to detect small flows. In addition, the clapper is biased towards its closed position in a positive fashion.

Many of the check valves heretofore provided have included coil springs which operate in tension to bias the check valve clapper towards its seat. Depending upon the design of such a detector check valve, it is possible to overstress the spring and change its spring rate. The hook ends of the spring define stress risers which may result in failure of the spring after cycling of the valve. Debris in the water may lodge between the coils of an extension spring and prevent the spring from closing the clapper or valve element.

A need exists for an improved detector check valve having increased reliability and improved failure characteristics.

SUMMARY OF THE INVENTION

In accordance with the present invention, the aforementioned need is substantially fulfilled. Essentially, a clapper or check valve subassembly is provided for movably mounting a clapper element within a check valve housing and resiliently biasing the clapper to a closed position. The subassembly includes a four-bar linkage having a base, an opposed cross arm and a pair of opposed support arms. A pair of draw bars extend diagonally between the support arms. A spring engages the draw bars. Opening movement of the subassembly places the spring in compression.

In narrower aspects of the invention, the linkage is a parallelogram linkage and each draw bar includes an elongated portion and a cross member which defines a stop. The spring is a coil spring encircling the elongated portions of the draw bars and engaging the cross members. The coil spring is placed in compression during opening movement of the clapper. The coils expand or move away from each other during closing movement of the clapper. Should debris get between the coils, it is freed when the clapper closes since the coils separate. Problems heretofore experienced with potential overstretching or overstressing of the spring are eliminated. The stress riser at the hook of the prior extension springs heretofore employed is also eliminated. The clapper or valve element subassembly and check valve in accordance with the present invention has the advantages of improved reliability and improved failure characteristics.

BRIEF DESCRIPTION OF THE DRAWINGS

FIG. 1 is a fragmentary, elevational view of a check valve assembly in accordance with the present invention;

FIG. 2 is a side, elevational view of a clapper or valve element subassembly incorporated in the check valve of FIG. 1; and FIG. 3 is a right, end elevational view of the subassembly of FIG. 2.

DETAILED DESCRIPTION OF THE PREFERRED EMBODIMENT

A detector check valve assembly in accordance with the present invention is illustrated in FIG. 1 and generally designated by the numeral 10. Assembly 10 includes a valve body or housing 12. Housing 12 defines an inlet end 14 having an attachment flange 16 and an outlet end 18 having an attachment flange 20. Housing 12 further defines a chamber 22 and a valve seat 24. A valve cover 26 is mounted on the housing and against a gasket 28 by a plurality of fasteners 30. Cover 26 permits access to the interior or chamber 22 of the valve subassembly.

A clapper or valve element subassembly 40 is mounted within chamber 22 of housing 12. As best seen in FIGS. 2 and 3, clapper subassembly 40 supports a clapper or valve element 42. Valve element 42 supports a seal 44. Seal 44 is held on clapper 42 by a retainer 45 in a conventional fashion. Clapper subassembly 40 mounts clapper 42 for movement towards and away from valve seat 24.

A linkage subassembly includes a mounting base 44. A first arm 46 is pivoted to an end 48 of base 44 by an elongated hinge pin 50. A second arm 54 is pivoted to an end 56 of base 44 by a pin 58. As seen in FIGS. 2 and 3, pin 58 is grooved at each end and receives clips or retainers 60, 62. A nut 64 is positioned on the pin 58 between base 44 and clip 62. A cross arm 70 is pivoted at its ends 72, 74 to lower ends 76, 78 of arms 46, 54, respectively. End 72 is pivoted to arm 46 by a pin 82 held by retainers 84. End 74 is pivoted to lower end 78 of second arm 54 by an elongated hinge pin 84. Pin 84 is held in position by retainers 86, 88. Retainers 90, 92 are positioned on the ends of pin 84.

The linkage arrangement is a parallelogram type linkage with opposed linkage members being of equal length. Clapper 42 is mounted on cross member 70 and/or first arm 46. Cross arm 70 is positioned at the center of the circular clapper 42. As shown in FIG. 1, base 44 is secured by suitable fasteners or by welding to housing 12 within chamber 22 to position clapper 42 at seat 24.

A draw bar subassembly 100 biases clapper 42 into engagement with seat 24 in a resilient, positive fashion. As best seen in FIGS. 2 and 3, draw bar subassembly 100 includes a pair of identical subassemblies 102, 104 positioned on or extended between hinge pins 50, 84 and with one assembly on each side of arms 46, 54. Each subassembly 102, 104 includes a pair of draw bars 110, 112. Each draw bar includes an elongated portion 114 and a cross member 116. An end of elongated portion 114 of draw bar 110 defines an aperture through which pin 84 extends. The end of elongated portion 114 of draw bar 112 defines an aperture through which hinge pin 50 extends. The draw bars are mounted diagonally between hinge points 50, 84 and arms 46, 54. The draw bars extend in opposite directions adjacent each other. A coil spring 130 is mounted on and encircles the draw bars. The coil spring engages cross members 116 of each draw bar. The cross members function as stops.

As should be readily apparent, opening movement of clapper 42 away from valve seat 24 in the direction of arrow A in FIG. 1 causes the cross members 116 of draw bars 110, 112 to move towards each other as the distance between hinge pins 50, 84 increases. Spring 130 is, therefore, placed in compression. As the clapper moves to a fully open position, the individual coils of the spring 130 may move towards each other until they contact and the solid height of the spring is achieved. Since the spring is placed in compression, higher allowable stresses and increased cycling are achievable when compared to an extension spring which may overstretch or break at the hook stress risers. Proper configuration and design of the compression spring takes advantage of the spring's inherent minimum solid height and permits compression to such solid height without overstressing which would cause an unacceptable change in spring rate. The compression spring in combination with the draw bars, therefore, provides a more reliable assembly.

The spring resiliently biases the clapper 42 toward its closed position. When the clapper moves to the closed position, the compression spring expands and the coils move away from each other. Debris in the water which could potentially lodge between the coils of the spring will not prevent operation of the spring and closure of the check valve. As the clapper closes, the coils separate and debris between the coils is freed. The failure characteristics of the valve are improved, therefore, from detector check valves heretofore available.

In view of the above description, those of ordinary skill in the art may envision various modifications which would not depart from the inventive concepts disclosed herein. It is expressly intended, therefore, that the above should be considered as that of the preferred embodiment only. The true spirit and scope of the present invention may be determined by reference to the appended claims.

The embodiments of the invention in which an exclusive property or privilege is claimed are defined as follows:

1. A check valve assembly comprising:
   a housing defining an inlet, an outlet, a seat and a chamber;
   a clapper; and
   clapper mounting means within said chamber for movably mounting said clapper and resiliently biasing said clapper towards a closed position against said seat, said clapper mounting means including:
   linkage means between said housing and said clapper for supporting said clapper for movement towards and away from said seat, said linkage means including a first arm and a second arm;
   a compression spring; and
   draw bar means connected to said linkage means, extending between said first and second arms and engaging said compression spring for compressing said spring as said clapper moves from the closed position to an open position away from said valve seat.

2. A check valve assembly as defined in claim 1 wherein said linkage means comprises:
   a base;
   said first arm having an end pivoted to the base;
   said second arm having an end pivoted to the base; and
   a cross arm having an end pivoted to said first arm and an end pivoted to said second arm.

3. A check valve assembly comprising:
   a housing defining an inlet, an outlet, a seat and a chamber;
   a clapper; and
   clapper mounting means within said chamber for movably mounting said clapper and resiliently biasing said clapper towards a closed position against said seat, said clapper mounting means including:
   linkage means between said housing and said clapper for supporting said clapper for movement towards and away from said seat;
   a compression spring; and
   draw bar means connected to said linkage means and engaging said compression spring for compressing said spring as said clapper moves from the closed position to an open position away from said valve seat, wherein said linkage means comprising:
   a base;
   a first arm having an end pivoted to the base;
   a second arm having an end pivoted to the base; and
   a cross arm having an end pivoted to said first arm and an end pivoted to said second arm, and wherein said draw bar means includes a pair of draw bars, each of said draw bars extending diagonally between said first and second arms.

4. A check valve assembly as defined in claim 3 wherein said spring is a coil spring which encircles said draw bars, each of said draw bars defines a stop and wherein the stop of one of said draw bars engages an end of said spring and the stop of the other said draw bars engages an opposite end of said spring.

5. A check valve assembly as defined in claim 4 wherein said linkage means is a parallelogram linkage.

6. A check valve assembly as defined in claim 5 wherein each of said draw bars is generally T-shaped in plan including an elongated portion and a cross member which defines said stop.

7. A check valve assembly as defined in claim 6 wherein one of said draw bars is pivoted to said first arm and the other of said draw bars is pivoted to said second arm.

8. A check valve assembly comprising:
   a housing defining an inlet, an outlet, a seat and a chamber;
   a clapper; and
   clapper mounting means within said chamber for movably mounting said clapper and resiliently biasing said clapper towards a closed position against said seat, said clapper mounting means including:
   linkage means between said housing and said clapper for supporting said clapper for movement towards and away from said seat;
   a compression spring; and
   draw bar means connected to said linkage means and engaging said compression spring for compressing said spring as said clapper moves from the closed position to an open position away from said valve seat, wherein said linkage means comprising:
   a base;
   a first arm having an end pivoted to the base;

a second arm having an end pivoted to the base; and a cross arm having an end pivoted to said first arm and an end pivoted to said second arm, and wherein said draw bar means includes a pair of draw bars and wherein each of said draw bars is generally T-shaped in plan including an elongated portion and a cross member which defines a stop.

9. A check valve assembly as defined in claim 8 wherein the elongated portion of one of said draw bars is pivoted to said end of said first arm and the elongated portion of the other of said draw bars is pivoted to said second arm so that the cross members move towards each other as the clapper moves to an open position.

10. A check valve assembly as defined in claim 9 wherein said spring is a coil spring encircling said elongated portions and contacting said cross members of said draw bars.

11. A clapper subassembly for use in a valve housing having an inlet, a seat and an outlet, said subassembly comprising:
a base;
a clapper;
linkage means attached to said base and said clapper for supporting said clapper for movement with respect to said base from a closed position towards an open position;
a spring; and
spring mounting means including an elongated draw bar connected to said linkage means and engaging said spring for compressing said spring as said clapper moves from the closed position towards said open position.

12. A clapper subassembly as defined in claim 11 wherein said linkage means comprises:
a pair of spaced support arms, each arm having an end pivoted to said base; and
a cross arm having ends pivoted to and extending between said spaced support arms.

13. A clapper subassembly for use in a valve housing having an inlet, a seat and an outlet, said subassembly comprising:
a base;
a clapper;
linkage means attached to said base and said clapper for supporting said clapper for movement with respect to said base from a closed position towards an open position;
a spring; and
spring mounting means connected to said linkage means and engaging said spring for compressing said spring as said clapper moves from the closed position towards said open position, said spring mounting means comprising a pair of elongated members, each of said members defining a stop engaging said spring.

14. A clapper subassembly as defined in claim 13 wherein said linkage means comprises:
a pair of spaced support arms, each arm having an end pivoted to said base; and
a cross arm having ends pivoted to and extending between said spaced support arms.

15. A clapper subassembly as defined in claim 14 wherein said elongated members each include an elongated portion and a cross member, said cross member defining said stop.

16. A clapper subassembly as defined in claim 15 wherein the elongated portion of one of said members is pivoted to one of said support arms and the elongated portion of the other of said members is pivoted to the other of said support arms and said members are positioned so that said stops move towards each other as the clapper moves from its closed position towards its open position.

17. A clapper subassembly as defined in claim 16 wherein said spring has opposite ends with each end contacting one of said stops.

18. A clapper subassembly as defined in claim 17 wherein each of said elongated members is generally T-shaped in plan.

19. A clapper subassembly as defined in claim 18 wherein said spring is a coil spring encircling said elongated portions of said members and having ends engaging said cross members.

20. A clapper subassembly for use in a valve housing having an inlet, a seat and an outlet, said subassembly comprising:
a base;
a clapper;
linkage means attached to said base and said clapper for supporting said clapper for movement with respect to said base from a closed position towards an open position;
a spring; and
spring mounting means connected to said linkage means and engaging said spring for compressing said spring as said clapper moves from the closed position towards said open position, said linkage means comprising:
a pair of spaced support arms, each arm having an end pivoted to said base; and
a cross arm having ends pivoted to and extending between said spaced support arms, and wherein said spring mounting means comprises a pair of elongated members, each of said members defining a stop engaging said spring.

21. A clapper subassembly as defined in claim 20 wherein each of said elongated members has an elongated portion and wherein the elongated portion of one of said members is pivoted to one of said support arms and the elongated portion of the other of said members is pivoted to the other of said support arms and said members are positioned so that said stops move towards each other as the clapper moves from its closed position towards its open position.

22. A clapper subassembly as defined in claim 21 wherein each of said elongated members is generally T-shaped in plan and includes a cross member defining said stop.

23. A clapper subassembly as defined in claim 22 wherein said spring is a coil spring encircling said elongated portions of said members and having ends engaging said cross members.

24. A clapper subassembly as defined in claim 23 wherein said subassembly further includes:
another spring; and
another spring mounting means connected to said linkage means and engaging said another spring for compressing said another spring as said clapper moves from the closed position towards said open position.

* * * * *